United States Patent [19]

Burt

[11] Patent Number: 5,108,609

[45] Date of Patent: Apr. 28, 1992

[54] IMPROVEMENTS IN AND RELATING TO THE TREATMENT OF LIQUIDS

[75] Inventor: David A. Burt, Bishop's Stortford, Great Britain

[73] Assignee: Burt Separators Limited, Herts, United Kingdom

[21] Appl. No.: 550,306

[22] Filed: Jul. 9, 1990

[30] Foreign Application Priority Data

Aug. 11, 1989 [GB] United Kingdom ............... 8918383

[51] Int. Cl.$^5$ ............................................. B01D 12/00
[52] U.S. Cl. ............................ 210/532.1; 210/532.2; 210/195.4
[58] Field of Search ................. 210/532.1, 532.2, 768, 210/802, 195.4; 119/5; 405/96

[56] References Cited

U.S. PATENT DOCUMENTS 4,036,176  7/1977  McCarty et al. ............... 119/5
4,146,937  4/1979  Baker ............................ 405/96
4,767,536  8/1988  Roley ........................... 210/532.1

FOREIGN PATENT DOCUMENTS 0308949  3/1989  European Pat. Off. ......... 210/232.1
1484727  9/1977  United Kingdom .

Primary Examiner—Robert A. Dawson
Assistant Examiner—Ana Fortuna
Attorney, Agent, or Firm—Watson, Cole, Grindle & Watson

[57] ABSTRACT

Liquids, specifically liquids containing suspended matter, may be treated by passage through a separator comprising means dividing the container into a first section, intermediate section and third section, with a flat topped weir dividing the first section from the intermediate section. The width of the flat topped weir is selected so that liquid flow over the weir is laminar. At least the flat topped portion of the weir is provided with a smooth surface so as to reduce friction and boundary effects which distort the desired flow pattern. This smooth surface may be constituted by an L-shaped stainless steel plate. The interior side walls of the container in the vicinity of the flat top of the weir may be coated with a two-part epoxy to provide smooth surfaces.

11 Claims, 4 Drawing Sheets

IMPROVEMENTS IN AND RELATING TO THE TREATMENT OF LIQUIDS

The present invention relates to a method of and apparatus for the treatment of liquids, more specifically to the treatment of liquids for the separation of suspended matter. The invention can be applied with advantage to the treatment of industrial effluents, though it is of wider application.

In UK Patent Specification No. 1,484,727 there is disclosed a separator comprising a container provided with means dividing the container into a first section, an intermediate section and a third section, with a parallel plate separator disposed in the intermediate section and a flat topped weir dividing the first and intermediate section. The width of the flat topped weir was selected such that liquid would flow over the weir under conditions of laminar flow.

The above described separator has been found to be very effective over a wide range of operating conditions and for treating a range of liquids with suspended matter. It has been found however that the performance of the separator can be improved The present invention provides a separator comprising a container provided with means dividing the container into a first section, an intermediate section and a third section the dividing means comprising a flat topped weir dividing the first and intermediate section, the width of the flat top of the weir in the direction in which liquid will flow across it being such that, in use, the liquid flows over the weir under conditions of laminar flow, wherein at least the flat topped portion of the weir is provided with a smooth surface whereby to effectively reduce friction and boundary effects which tend to distort the desired flow pattern.

Preferably, the smooth surface is formed by a plate which is advantageously of stainless steel. The plate extends over the full width of the weir and downwards at the front of the weir in the direction of fluid flow (i.e. downwards at the end of the weir closer to the inlet).

It has also been found advantageous to coat the side walls of the container in the area of the weir with a material, preferably a two-part epoxy, to provide a smooth surface.

Features and advantages of the present invention will become apparent from the following description of an embodiment thereof when taken in conjunction with the accompanying drawings, in which.

Figure 1:
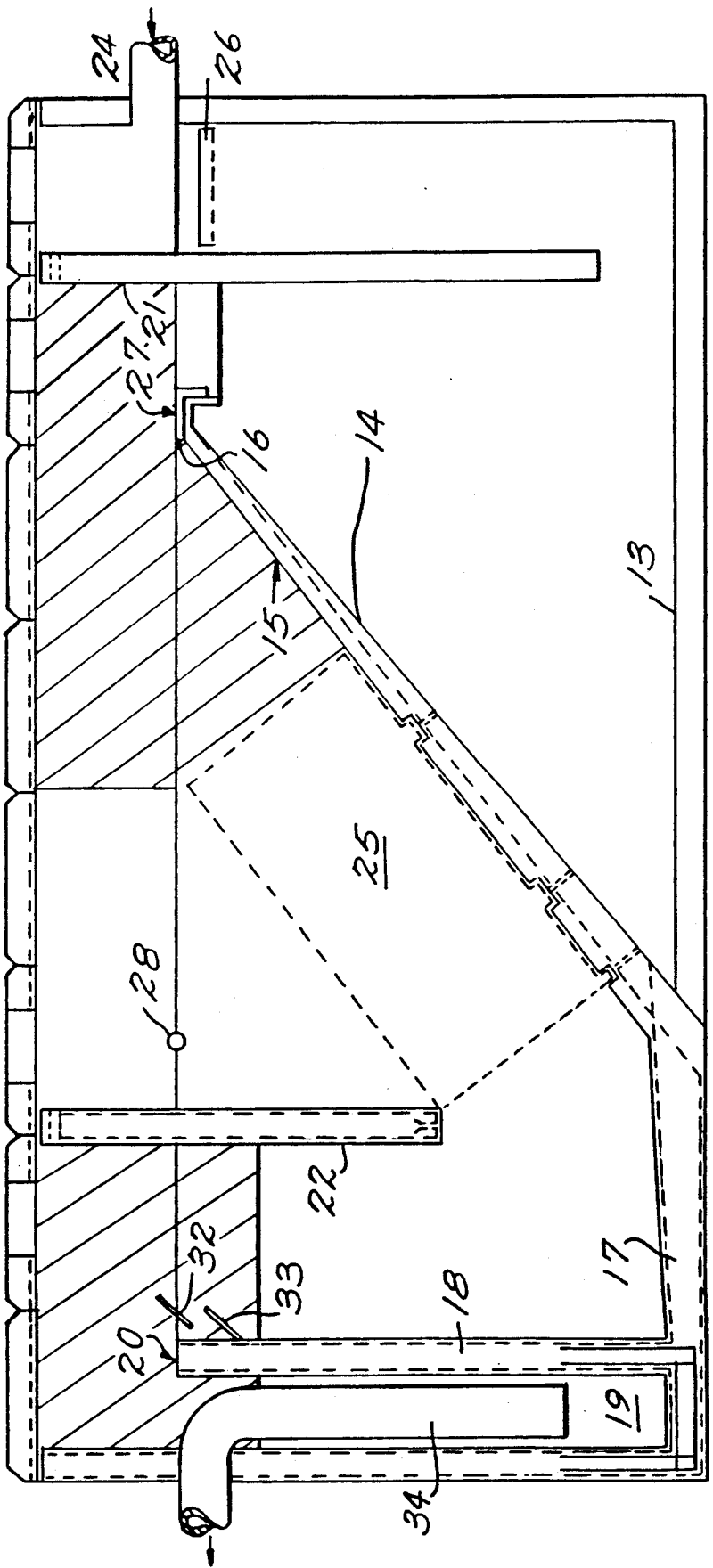
FIG. 1 is a vertical diagrammatic sectional view through a liquid treatment installation.
Figure 2:
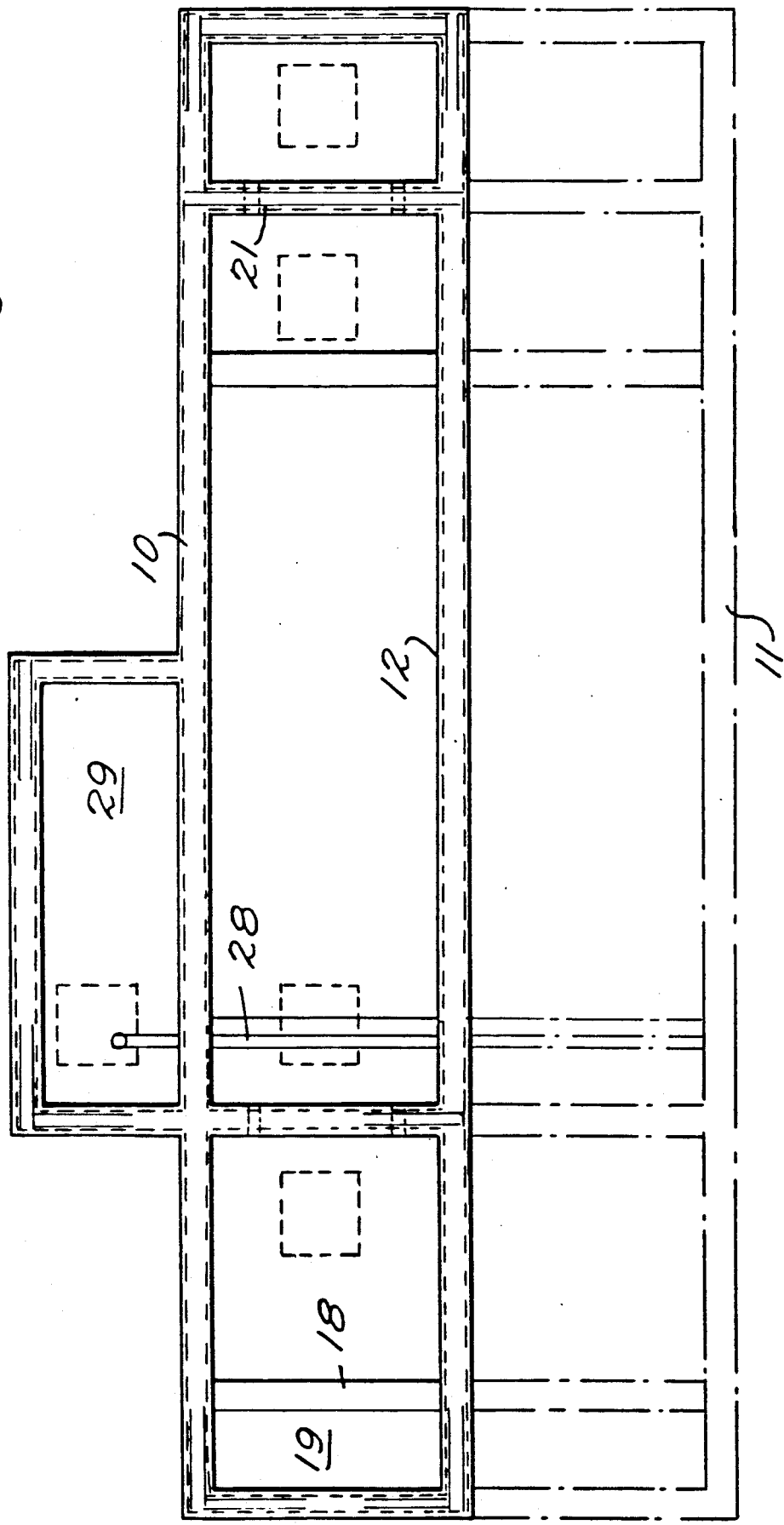
FIG. 2 is a plan view of the installation of FIG. 1, with the covers partly in position.

The treatment installation shown comprises a main outer container formed as a tank. In UK patent No. 1,484,727 a concrete container was preferred. The presently preferred construction uses a steel tank. The structure has side walls 10 and 11, with a central dividing wall 12, to provide in effect two separation units, side by side, with common inlets and outlets. The side walls and the dividing wall are vertical and parallel, and the floor of the installation is shaped, as is more clearly shown in FIG. 1, so as to present a first section 13 which is approximately horizontal, and which terminates at a barrier 14. The barrier 14 provides a long downwardly sloping floor 15. The top edge of this barrier at 16, is flat and horizontal.

The floor 15 extends to a further substantially horizontal section 17, in which barrier 18 defines an outlet chamber 19. The top 20 of barrier 18 is at the same level as the top 16 of barrier 14 and is also flat.

Two baffles are provided, the first of which is at 21, in the inlet side of the apparatus and the second at 22 approximately above the lower end of the sloping floor 15. The arrangement of the barriers and baffles in the two parallel units is the same.

Figure 3:
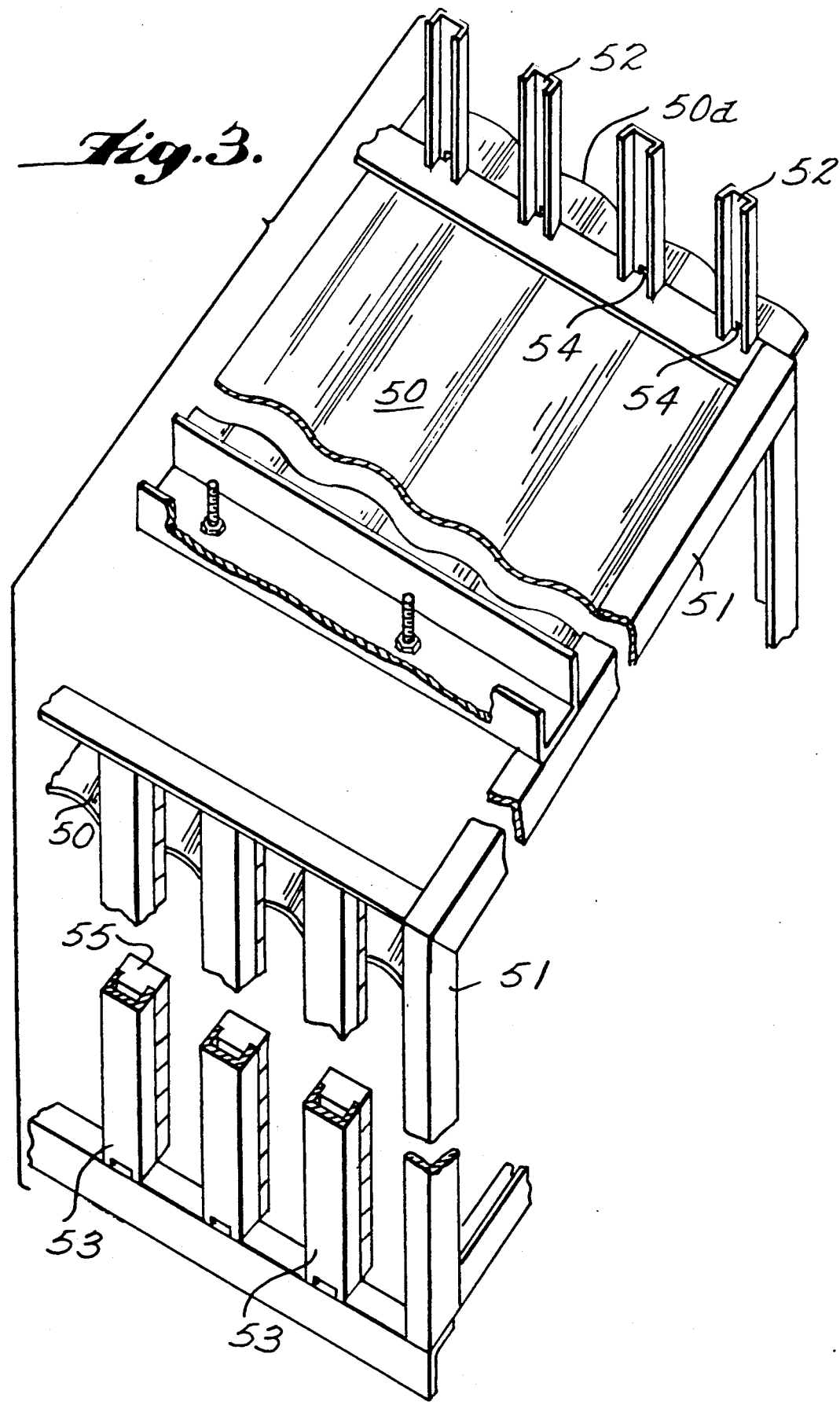
FIG. 3 is a perspective view, partially broken away, of a separator element, "sludge pack", for use with the installation of FIG. 1.

In the middle part of each unit of the installation is a separator element, or "sludge pack" 25. As shown in FIG. 3, the construction of a suitable sludge pack comprises a stack of sheets 50, of corrugated material mounted with a frame 51; the number, dimensions, spacing and material of these sheets depends upon the materials to be treated or separated.

Successful results have been obtained using corrugated unplasticised p.v.c. sheet (as in the specific embodiment shown in the figures), as commercially available However, it is preferred to use Aluminium sheets since these are rougher and relatively inert.

The sheets are stacked with the crests of the corrugations in alignment. The sludge pack is disposed in the centre section of the container at an angle; resting on the sloping floor of the centre section. The corrugated sheets are held in spaced relationship within the frame by spacers assembled on rods. To improve the mechanical strength, the bottom sheet of the sludge pack can be of aluminium, and the sheets can be sealed to the side walls 10, 11 and 12 of the container between which the sludge pack extends. The topmost sheet 50a of the separator stack is of greater length than the others above the level of the top of baffle barrier 14 and hence the level of the liquid in the container.

At each end of the sludge pack are disposed a series of vertical channel section members, arranged with channels facing towards the centre of the sludge pack; the members at 52 at the upper end are disposed adjacent the crests of the topmost corrugated sheet and the members 53 at the lower end of the sludge pack, are positioned adjacent the troughs of the sheets of the sludge pack. Openings 54 are provided in the topmost sheet 50a to allow liquid in the members 52 to travel up out of sludge pack.

Figure 4:
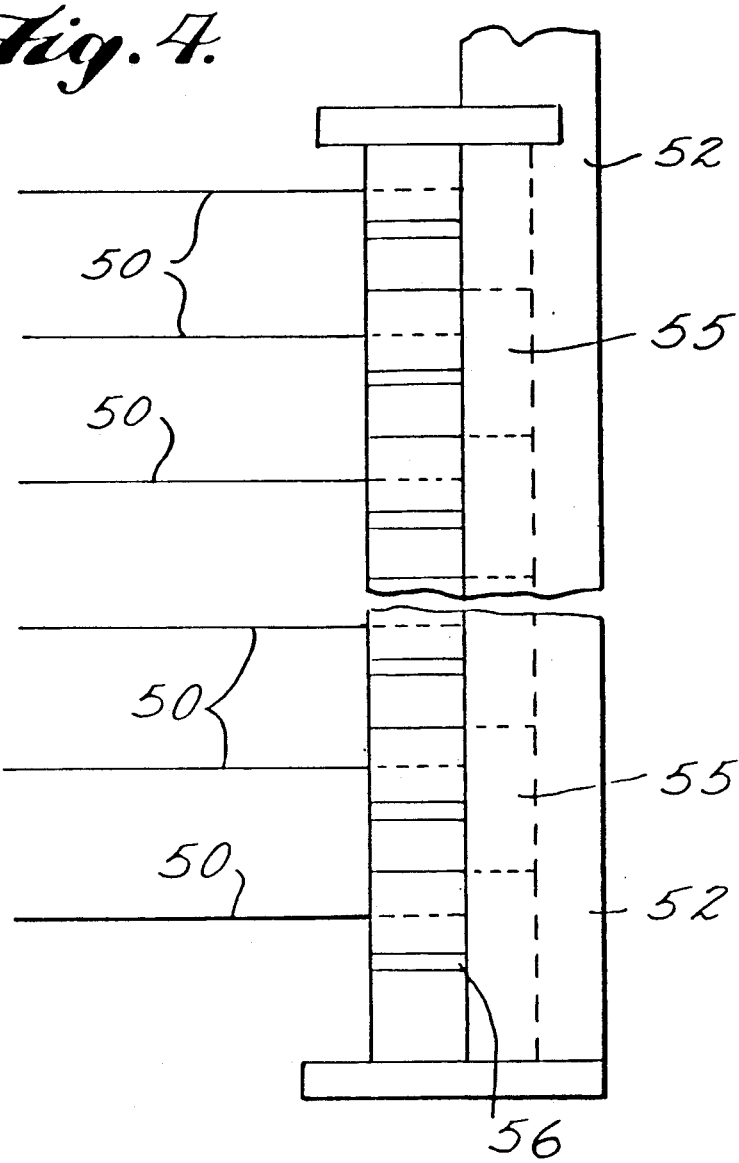
FIG. 4 is a broken away side view of a part of the sludge pack of FIG. 3.
Figure 5:
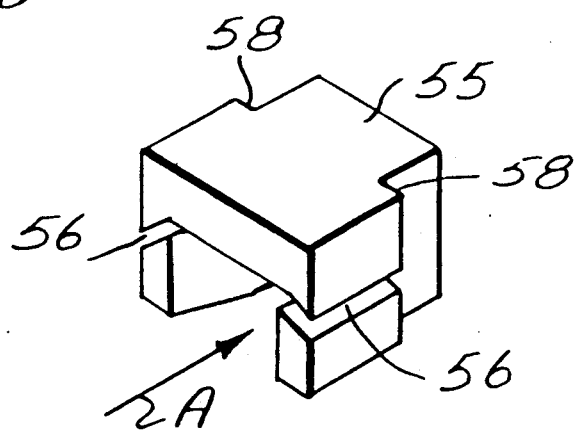
FIG. 5 is a perspective view of a spacer block used in the sludge pack of FIG. 3.

The sheets 50 are joined to spacer blocks 55 (FIG. 5) by shaped slots 56 in the blocks and centrally located by the channel members 52 as shown in FIG. 4. This has the advantage that the sheets tend to be self-locating in the stack, which greatly facilitates assembly. A similar arrangement is used for joining the sheets to channel members 53. A spacer block 55 is shown in more detail in FIG. 5. A crest of a sheet 50 is received in the shaped slots 56 and material collected on the underside of the crest passes through an opening (not shown) in the block 55 in the direction of the arrow A and thence into the channel member 52 attached to the spacer block by being received on shoulders 58 of the block as shown in FIG. 3.

The angle at which the sludge pack is arranged in the central section of the container has been found to be important in securing optimum performance of the separator. It appears desirable that the angle of inclination of the sludge pack should be approximately 40° to the horizontal, and preferably within a few degrees of this angle. An angle of 45° appears to be too great, and 35° too little; these results have been obtained using a sludge pack for the separation of what is principally oil in water, and separation of other materials from water may require other angles of inclination, as may be readily determined by experiment. Also, it appears desirable that the plane of the lowermost sheet of the sludge pack should intercept the level of liquid in the central section as determined by the height of the barrier 14, with the object of securing laminar flow through the section, and particularly the sludge pack.

In one practical form of the invention the sludge pack has overall dimensions of 48 inches wide 47 ½ inches deep and 8 ft long with a 9 inch extension on the top sheet. The pack consisted of 58 sheets of natural transparent unplasticised rigid P.V.C. 3 inch corrugated sheets. Each sheet was 8 ft long, combined width of 47 ¼ inches with corrugations, 25/32 inch pitch and 2 ¼ inch crest to crest. The thickness did not exceed 1/16 inch, the weight did not exceed 8 oz per ft$^2$, the coefficient of linear expansion did not exceed $2.0 \times 10^{-5}$ per °F. and tensile strength exceeded 7,000 lbs.in. The water absorption was about 0.10%

The pack was boxed by $1'' \times 1'' \times 3/16''$ angles on the sides and edges, two straps 1 ½" wide and 3/16" thick. 2'0" from each end of the pack on the sides and bottom and similarly at the top of the pack.

The intermediate straps were of 1 ½" × 1 ½" × 3/16" channel across the top with two lifting eyes to each strap, each lifting eye capable of lifting 500 lbs. The sides of the pack were enclosed with unplasticised rigid P.V.C. flat sheet 1/25" thick between the edge of the corrugated sheets and the angles or straps.

The collection channels consisted of 1" web and ½" flange × 3/32 thickness overall steel channels, tack welded to the straps at the top and bottom. Seventeen channels were provided, centrally placed on the crests at the top of the pack and on the troughs at the bottom of the pack. The top channels were 4'6" long and the bottom 4'0".

The P.V.C. sheets were separated by ¼" diameter bolts with ¾" long hollow steel distance pieces of internal diameter 9/32 inches. The bolts were provided at alternate crests on the lower steel frame and alternate troughs on the upper frame. The straps were drilled to take the bolts top and bottom.

In operation, the fluid to be treated is admitted from an inlet at 24 to the first section of the container, which acts as a sediment tank. An opening (not shown) leads to an overflow chamber. A trash tray 26 can be located in each input section if desired to collect solid sediment and any solid foreign bodies.

In the input section, the liquid will rise to the level of the weir formed by the top edge 16 of barrier 14. As described in UK Patent No. 1,484,727 the operation of the installation appears to be much concerned with the flow conditions which exist at this weir. For example, the weir is broad in the sense that the length of flow over the weir is sufficiently extended for the flow to be laminar as it leaves the downstream edge of the weir. It has been found that when the flow is laminar, the discharge from the laminar flow stream into the body of liquid below the weir, which is relatively insert, gives rise to agglomeration or aggregation of oil particles suspended in the liquid under treatment, with consequent improvement in the efficiency of the apparatus in removing suspended material.

The liquid, after passing over the weir at the top of barrier 14, flows through the sludge pack in laminar flow conditions. In this flow of liquid through the sludge pack any content of the liquid which is lighter than water will tend to rise to the crest of the corrugations in the sheets and, by buoyancy, will rise up the inclined sheets, against the flow of liquid, until at the top of the separator, the separated lighter components will enter the channels of the upper channel members 52, and continuing to rise by buoyancy, will pass through the openings 54 in the topmost sheet to be discharged into that portion of the central section of the container, above the sludge pack, there to be contained by the upper part of baffle 22 and the extension of the top-most sheet of the pack. Any materials which are essentially heavier than water will, in somewhat similar fashion, be carried down the troughs of the corrugations, to be discharged into the channels of the lower members, and to collect at the lower end of the sloping floor in section 17.

The light components, such as oil, which rise to the surface may be drawn off, for example by a swivel type oil skimmer 28 (consisting of a horizontal pipe at liquid level, with a longitudinal slot into which surface oil can enter and be drawn off into collection chamber ) or by a rotating-plate oleophilic skimmer. The heavier particles collecting at the lower end of sloping floor 15 in section 17 can be drawn off through a suction pipe.

The liquid will accumulate behind the weir formed by the top of the barrier 18. It has been found that where the liquid to be separated includes light oils such as kerosene these tend to collect in this part of the installation, behind barrier 18. Such light oils, and other floating coagulants, can be prevented from passing over the weir by means of baffles; in FIG. 1, two such baffles are used, located at 32 and 33. The baffles are of anodised aluminium and extend fully across the width of the separator unit. Anodised aluminium repels the kerosene which builds up behind the baffles. In practice, it has been found to evaporate but if necessary it can be drawn off by a skimmer.

The liquid passing over the weir at the top of baffle 18 collects in the outlet chamber at 19 the liquid is drawn off, through outlet pipe 34. It has been found advantageous to maintain an undulating or resonant motion of the liquid in outlet chamber 19; this can be established by making the chamber of appropriate volume and using suitable flow condition.

An installation as described has proved highly successful in practice, and an installation in trial conditions used to treat an effluent containing 400 parts per million of polluting material to approximately 1 part per million at the outlet.

The rate of flow of liquid into the unit is carefully controlled, in order to secure an optimum speed of movement of the liquid downwardly between the sheets of the sludge pack 25. The optimum speed, for best separation, depends upon the liquids being treated and the dimensions of the parts, but for the material mentioned above, speeds in the region of 5 to 15 millimeters per second have been found satisfactory.

In UK patent No. 1,484,727, it was described that the oily water mixture if passed trough the unit in laminar flow will separate more quickly than turbulent flow. To achieve laminar flow it was stated that the influent should be passed over the broad crested weir of dimensions to suit the flow. It is also desirable to pass the effluent over a similar weir at the outlet so that the flow throughout the tank is uniform A broad crested weir may be defined as a broad crested regular obstruction over which flow occurs. The broad crest must be of such a dimension that the profile of the fluid surface over the crest will be parallel to the weir surface. The conditions of the flow over this weir can be deduced from the general hydraulic energy equation. In the embodiments shown, the flat top 16 of the weir formed by the barrier 14 has a width, i.e. in the flow direction, of 250 mm. A lesser width such as 170 mm, suffices in some conditions. The flat topped portion 20 of baffle 18 has a width of 200 mm to ensure laminer flow over the top 20 and hence through the unit.

At the broad crested weir 16, the influent undergoes a change of speed from tranquil to rapid and returning to tranquil flow. During this process the oil particles tend to coalesce readily, and when the specific gravity of the oil/water at the weir section has changed considerably, the congealed oil flows to the sludge pack. The particle size of the coalesced oil was found to be considerably greater than the oil globule size of the influent, and thus separated at a much greater speed.

It is necessary to design each plant for the specific influent. The parameters required are flow, globule size and coalesced size, temperature, specific gravity, viscosity and degree of pollution. Each parameter has its own importance in this process The rate of rise in the sludge pack- is governed by the globule size, specific gravity and viscosity which in turn is determined by the temperature and flow. The size of the broad crested weir is determined by the maximum flow, viscosity and specific gravity of the influent.

The basic unit of UK patent No. 1484727 has proved in operation to be very successful in the treatment of industrial effluent and the like. However, a new understanding of the processes taking place in the basic unit has enabled a modified design to be developed giving an enhanced performance It has been found in the present invention that at the broad crested weir 16, the change of speed which the influent undergoes from tranquil flow to rapid flow as it rises from the bottom of the container (at the bottom of the baffles 21) to the crest of the weir 16 at the front (inlet side) thereof, causes the oil in the oily water mixture when it reaches the top of the liquid to spread out very rapidly over the surface of the liquid covering the weir crest so as to form a very thin layer. To the naked eye the rising oil appears to explode over the liquid surface. During this process the globules of oil in the influent, which have various contaminant particles entrapped within themselves, are broken up. The contaminant particles are thus freed from the oil and settle out. The oil particles are carried out relatively gently over the broad crested weir (in tranquil flow in the surface layer) and coalesce to form relatively large globules of purified oil.

The efficiency of this separation/coalescence stage is related to the extent to which the rapid flow/ tranquil flow boundary which occurs at the crest of the weir 16 is kept regular and well-defined It has been found that friction between the liquid and the weir and/or container walls tends to distort the rapid flow/tranquil flow boundary. Similarly edge effects where the rapid flow/tranquil flow boundary meets the container walls tend to distort the boundary It has been found that the operation of the basic unit can be enhanced by ensuring that the broad topped weir is provided with a smooth surface which, preferably, will retain its smoothness throughout the life of the unit. Advantageously this is achieved by means of a stainless steel plate 27 fitted over the broad crested weir. The plate is preferably L-shaped and extends over the front as well as the crest of the weir.

The stainless steel plate prevents the above-described friction and boundary effects, which interfere with the desired energy change over the weir and is wear resistant.

In this respect it has also been found beneficial to paint the side walls 10 and 11 of the container in the area of the weir with a material which provides a smooth surface to the walls e.g. a two part epoxy resin. The area coated with epoxy is indicated in the drawing by hatched lines.

If desired, the downstream weir 20 also may be provided with a stainless steel plate to ensure laminar flow. The wall in the area of the weir 20 can also be painted with a two part epoxy to provide a smooth surface.

Although, as mentioned above, it is advantageous to provide the broad crested weir 16 with a smooth surface by means of attaching a stainless steel plate (because of the resistance of stainless steel to wear), it would also be possible to use a smooth surfaced plate of a different material, for example a less durable material, provided that the operator of the unit would be prepared to change the plate every so often as it wore down. Similarly, the broad crested weir 16 could alternatively be coated with a non-stick surface (such as a two-part epoxy resin) if the operator were to be prepared to resurface the weir every so often.

In the above embodiment, the channel members 52 and 53 are at right angles to the direction of the flow through the sludge pack and therefore at 40° to the vertical. The construction of the sludge pack can be altered so that the channel members are at an angle to the horizontal which is greater than 40° and in some cases can be used up to 90°. It is to be understood that the angle which the sheets 50 make with the horizontal remains at the optimum angle for separation in this case 40°. This can be done with the arrangement as shown in FIG. 1 by displacing the sheets relative to each other until the unit 25 assumes shape of a parallelogram. Decreasing the angle which the channels make with the vertical has the advantage that the matter in the channels will tend to rise faster toward the exit ends of the channels.

The size and inclination of the sludge pack is determined by the rate of rise and degree of pollution.

There are circumstances in which it may be convenient to reverse the flow of fluid through the sludge pack, from the bottom to the top. In this case the results can be supplemented by the use of an overflow device, consisting of a sloping surface, corrugated by horizontal corrugations over which the liquid from the discharge end of the pack will pass. Along the line of the corrugations, at a region where, with the appropriate rate of liquid flow, there will be region of reduced pressure, slots can be cut, by which air will be admitted to the liquid, and drawn into it by reason of the reduced pressure created by the liquid flow. Such an arrangement is of use when treating liquid containing oxygen- demanding organic materials.

Although the particular embodiment uses a sludge pack having corrugated sheets thereon, other known parallel plate separators could alternatively be used.

In trials, it has been found advantageous to provide another baffle arrangement at the inlet of the separator.

It is also desirable to use a baffle at the inlet when reverse flow operation is in use. The maximum rate of flow over the weir has been found to be about 700 mm/sec.

I claim:

1. A separator comprising:
   a container having a floor and side walls, first and second barrier means extending form the floor and dividing the container into a first section, an intermediate section and a third section;
   an inlet means to the first section;
   an outlet means from the third section; and
   a flat topped weir provided on the first barrier means which divides the first and intermediate sections, the flat topped weir being provided with a smooth surface to reduce friction and boundary effects and being of a width in the direction in which fluid will flow across it such that, in use, the liquid flows over the weir under conditions of laminar flow;
   the first section having a baffle extending across the container and disposed in the path of liquid flow from the inlet means to cause liquid to flow under the baffle, the baffle and the first barrier means forming a space for the liquid which continuously decreases in horizontal cross-sectional area in the direction of liquid flow from the bottom of the baffle to the flat topped weir to increase the speed of liquid flow.

2. A separator as claimed in claim 12, wherein the smooth surface on the flat topped weir is provided by a plate extending over the flat top of the flat topped weir and extending downwards at the front of the weir in the direction of fluid flow, the plate being of a wear-resistant material.

3. A separator as claimed in claim 2, wherein the plate is of stainless steel.

4. A separator as claimed in claim 12, 2 or 3, wherein a layer of non-stick material is provided on the interior walls of the container in the region of the flat topped weir 5. A separator as claimed in claim 4, wherein the layer of non-stick material comprises a two-part epoxy resin.

6. A separator as claimed in claim 1, 2, 3 or 5, wherein the dividing means comprises a further flat topped weir dividing said third and intermediate sections, which further weir is in the direction in which liquid will flow across it such that, in use, the liquid flows over the further weir under conditions of laminar flow, wherein the flat topped portion of the further weir is provided with a smooth surface.

7. A separator as claimed in claim 6, wherein the flat topped portion of the further weir is provided with a smooth surface by means of a plate, of wear-resistant material, extending over the flat-topped portion of the further weir and extending downwards at the front of the further weir in the direction of fluid flow 8. A separator as claimed in claim 7, wherein the plate on the further weir is of stainless steel.

9. A separator as claimed in claim 6, wherein a layer of non-stick material is provided on the interior walls of the container in the region of the flat topped portion of the further weir.

10. A separator according to claim 1, 2, 3 or 5, further comprising a separator element in the intermediate section, said separator element being a parallel plate separator.

11. A separator according to claim 10 wherein the separator element comprises a plurality of inclined supersuposed spaced corrugated sheets, channel means connected to the undersides of the crests of the corrugations of said sheets for collecting material rising on the undersides of the crests, and further channel means connected to the uppersides of the troughs of the corrugations for collecting material falling on the uppersides of the troughs.

* * * * *